United States Patent Office 3,533,642
Patented Oct. 13, 1970

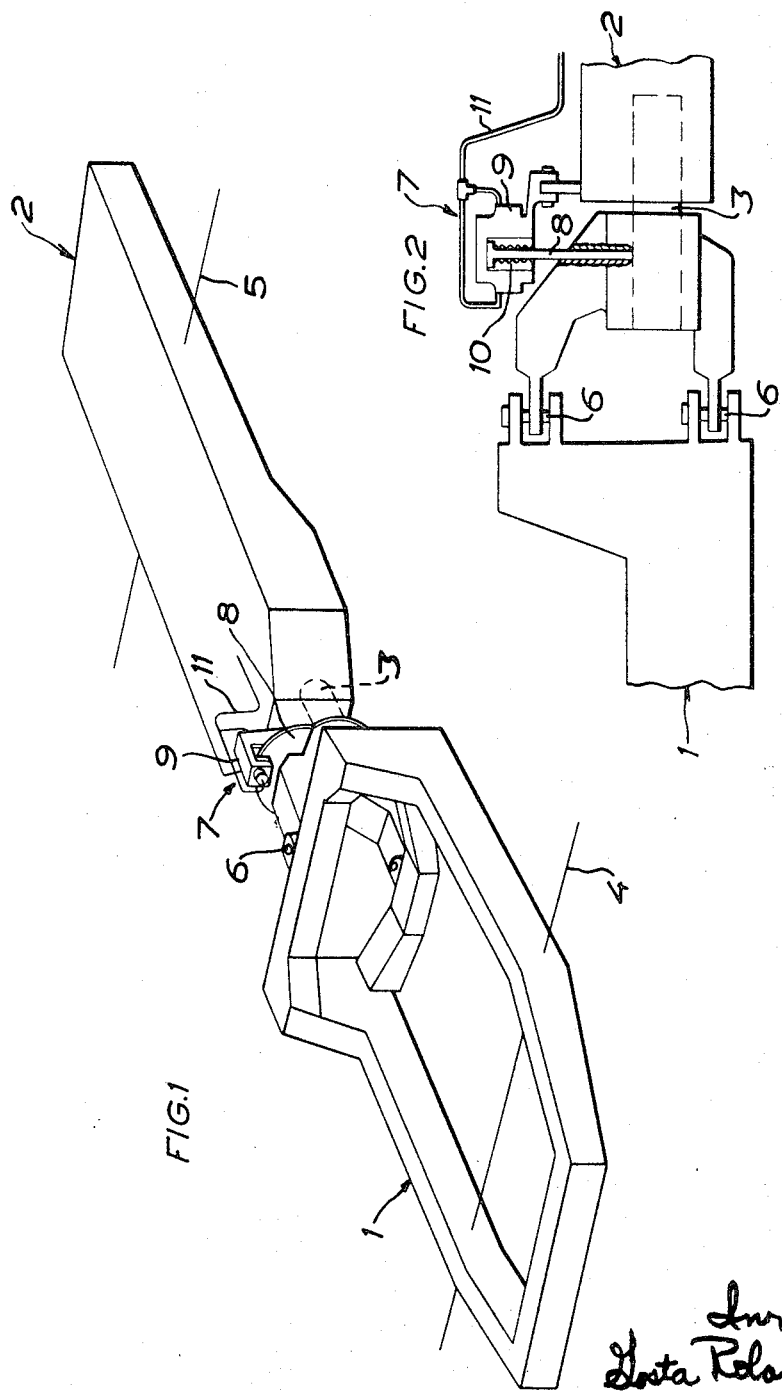

3,533,642
VEHICLES
Gosta Roland Cederlund, Nykoping, Sweden, assignor to Aktiebolaget Farming, Nykoping, Sweden
Filed Apr. 9, 1968, Ser. No. 719,940
Claims priority, application Sweden, Apr. 14, 1967, 5,198/67
Int. Cl. B26d 21/00
U.S. Cl. 280—106
6 Claims

ABSTRACT OF THE DISCLOSURE

A two-part vehicle with wheels mounted on the two parts thereof which are relatively rotatable on a shaft extending longitudinally of the vehicle, comprises a locking mechanism mounted on the two vehicle parts to permit interlocking them in different angular positions.

---

This invention relates to a vehicle of the type comprising two parts having the vehicle wheels mounted thereon and being relatively rotatable on a shaft which extends in the longitudinal direction of the vehicle. Characteristic of the vehicle is that a locking mechanism is mounted on the two vehicle parts to permit interlocking them in different angular positions. With a vehicle of the construction suggested by the invention a crane mounted on such vehicle can be loaded to a considerably higher degree than in a conventional crane carrying vehicle, as the entire vehicle balances the crane by reason of said interlocking. To this comes that there is a considerably smaller risk of an overturning of the vehicle at cross-country driving since one vehicle part balances the other vehicle part when these parts are interlocked.

For a better understanding, the invention will be described more in detail in the following, reference being made to the accompanying drawing illustrating an embodiment of the vehicle, chosen by way of example.

In the drawing:

FIG. 1 is a perspective view of the frames of the vehicle forming the two parts thereof;

FIG. 2 is a side view of the facing portions of the vehicle frames.

The vehicle is of the type comprising two parts 1 and 2 which have the vehicle wheels mounted thereon and are represented by the frames illustrated. These two frames 1 and 2 are relatively rotatable on a shaft 3 which extends longitudinally of the vehicle and can be designated as horizontal.

More particularly, the vehicle is of the all-wheel drive type and as indicated in the drawing it is equipped with four driven wheels, two on the wheel axle 4 and two on the wheel axle 5. The vehicle could have steerable wheels but in the embodiment illustrated steering is brought about by pivotment of the two vehicle frames 1 and 2 in relation to one another about at least one vertical fulcrum 6.

The vehicle suggested by the present invention includes a locking mechanism 7 mounted on the two vehicle frames 1 and 2 and serving to interlock the frames in different angular positions. The locking mechanism 7 should preferably be of such a nature that locking can be performed in any angular position whatever. The locking mechanism 7 therefore should be of the infinitely interlocking type.

As will appear from the drawing, the locking mechanism 7 incorporates a disk 8 fixedly arranged on the frame 1 at right angles to the shaft 3, and a clamping device 9 fixedly arranged on the frame 2, said clamping device being adapted to clamp the disk 8 by one or more clamping means 10 to provide interlocking of the two vehicle frames 1 and 2.

The disk 8 is a circle segment and has its centre of curvature on the shaft 3. The clamping device 9 which is adapted to clamp the disk at the periphery thereof includes a pair of jaws or like clamping means 10 which are engageable with the two side faces of the disk 8. The jaws 10 can be engaged with the disk 8 under the action of a pressure medium to realize said interlocking. The line for the pressure medium, preferably pressure oil, is designated 11.

To provide efficient interlocking it is of the utmost importance that the portions of the clamping means 10 engaging the disk 8 are knurled, serrated or otherwise made rough. This will provide a deforming engagement with the disk 8, which has been found necessary. Therefore, a conventional disk brake normally does not give the desired result.

The locking mechanism 7 should be arranged for manual operation so that it can be actuated for example when a crane mounted on the vehicle is to be put in use. The locking mechanism 7 should, however, be arranged also for automatic operation when the two relatively rotatable vehicle frames 1 and 2 occupy a certain angular position in relation to each other to prevent overturning of the vehicle at cross-country driving. The angular position between the two frames 1 and 2, in which the locking mechanism 7 is adapted for automatic operation, should be made dependent upon the pivot angle between the two frames 1 and 2. The greater said pivot angle the smaller the angle of rotation between the frames 1 and 2, at which the locking mechanism 7 is actuated.

In order that the locking mechanism 7 shall be most efficient in operation the centres of gravity of the two frames 1 and 2 should lie on one hand on the median axis of the vehicle determined by the shaft 3, and on the other hand on the wheel axle 4 and 5, respectively, of the associated frame 1 or 2. Thus the centres of gravity should lie on the vertical lines through the points of intersection of said axis and said wheel axles, respectively.

The invention is not limited to the embodiment described above and shown in the drawing, but permits of being modified within the scope of the appended claims.

What I claim and desire to secure by Letters Patent is:
1. A vehicle comprising
   a shaft extending in the longitudinal direction of the vehicle,
   two parts having the vehicle wheels mounted thereon and said parts being relatively rotatable on said shaft;
   a locking mechanism mounted on said two vehicle parts to permit interlocking them in different angular positions,
   said locking mechanism being of the type which incorporates a disc fixedly arranged on one of said vehicle parts at right angles to said shaft,
   said clamping device adapted to clamp said disc at the periphery thereof including a pair of jaws or like clamping means fixedly arranged on the other of said vehicle parts which are engageable with the two side faces of said disc.

2. A vehicle as claimed in claim 1, in which said clamping means are engageable with said disc under the action of a pressure medium to realize the interlocking of said vehicle parts.

3. A vehicle as claimed in claim 1, in which the portions of the clamping means engaging said disc have roughened surfaces.

4. A vehicle as claimed in claim 1, in which said locking mechanism is arranged for manual operation.

5. A vehicle as claimed in claim 1, in which said locking mechanism is arranged for automatic operation when said two relatively rotatable vehicle parts occupy a certain angular position in relation to each other.

6. A vehicle as claimed in claim 5, in which said two parts forming the vehicle are pivotally interconnected by means of at least one vertical fulcrum, wherein the relative angular position of said two vehicle parts, in which said locking mechanism is adapted for automatic operation, is dependent upon the pivot angle between said two vehicle parts.

References Cited

UNITED STATES PATENTS 3,253,671 5/1966 Fielding _____ 180—51
3,291,244 12/1966 Garrett _____ 180—51

PHILIP GOODMAN, Primary Examiner

U.S. Cl. X.R.

180—51